3,658,811
PROCESS FOR THE OPTICAL RESOLUTION
OF MIXTURES OF L- AND D-α-AMINO-
ε-CAPROLACTAM
Ikuzo Tanaka, Yasuhisa Ohno, and Tadashi Okada,
Tokyo, Japan, assignors to Teijin Limited, Osaka, Japan
No Drawing. Filed Dec. 3, 1969, Ser. No. 881,881
Claims priority, application Japan, Dec. 5, 1968,
43/89,405, 43/89,406; Dec. 13, 1968, 43/91,462;
Apr. 2, 1969, 44/24,787; July 22, 1969, 44/58,266;
Aug. 7, 1969, 44/62,528
Int. Cl. C07d 41/06
U.S. Cl. 260—239.3                                    8 Claims

ABSTRACT OF THE DISCLOSURE

Process for the optical resolution of a mixture of L- and D-α-amino-ε-caprolactams by treating the mixture with an optically active N-benzoyl- or N-paranitrobenzoyl-glutamic acid in an aqueous medium or alcoholic medium. In this way, L- or D-α-amino-ε-caprolactam in a pure form can be obtained at high yields.

---

This invention concerns a process for the optical resolution of mixtures of L-α-amino-ε-caprolactam and D-α-amino-ε-caprolactam. More particularly, the invention relates to a novel process for the optical resolution of mixtures of L- and D-α-amino-ε-caprolactam using derivatives of L- or D-glutamic acid of the following formula

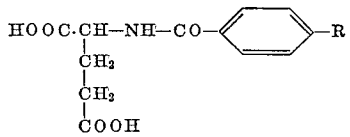

in which R represents a hydrogen atom or a nitro group (—$NO_2$) as a resolving agent.

α-Amino-ε-caprolactam can be synthesized from ε-caprolactam or intermediates thereof which are available in large quantities and at low cost as starting materials for synthetic fibers such as nylon-6. Moreover, this substance can be very easily hydrolyzed to give lysine. Therefore, much attention is presently paid to this substance as an intermediate with economical advantages for the synthesis of lysine. Because the compound is normally obtained in racemic form, i.e., a mixture of equal parts of D-form and L-form, the racemic α-amino-ε-caprolactam or racemic lysine must be resolved in order to obtain optically active lysine which is valuable for medicinal uses or as a fortifing agent of human or animal diets.

Methods for the optical resolution of racemic lysine or mixtures of D- and L-lysine can be largely divided into enzymatic or chemical processes. Concerning these processes, many specific methods have been heretofore proposed. However, none of them has proved to be decisively of advantage for the optical resolution of mixtures of D- and L-lysine, and none has yet been industrially adopted. Accordingly, ever since processes for industrial preparations of lysine through a synthetic intermediate of racemic α-amino-ε-caprolactam became known, the significance of methods that will make it possible to resolve racemic α-amino-ε-caprolactam, or mixtures of L- and D-α-amino-ε-caprolactam, with high efficiency has increased unmeasurably.

In the art of optical resolution of mixtures of L- and D-α-amino-ε-caprolactam, the Geigy process (U.S. Pat. No. 3,275,619). and Stamicarbon N.V. process (Belgian Pat. No. 696,183) are already known. In the former, L-pyrrolidone carboxylic acid is used as a resolving agent, and ethanol or methanol is used as a resolving solvent, while the latter uses the same resolving agent but uses mixtures of water and a water-immiscible organic solvent as a resolving solvent. However, L-pyrrolidone carboxylic acid is expensive because it is synthesized with considerable difficulty. Furthermore, when it is used as the resolving agent, the salt thereof formed with L- or D-α-amino-ε-caprolactam cannot be easily separated from the solvent. Consequently, not only is the recovery of the salt difficult, but also the recovery of L-pyrrolidone carboxylic acid by decomposition of the salt is forced to be low. In addition, when a mixed solvent composed of water and a water-immiscible organic solvent is used in accordance with the process of Belgian Pat. No. 696,183, the efficiency of the optical resolution is comparatively low. The procedure must be repeated for the purpose of raising the optical purity of the resultant L- or D-α-amino-ε-caprolactam to a satisfactory degree. Thus the procedure becomes objectionably complex.

In view of the foregoing considerations, we have engaged in studies and experiments in searching satisfactory resolving agents for mixtures of L- and D-α-amino-ε-caprolactam, and found that derivatives of L- or D-glutamic acid of the following formula

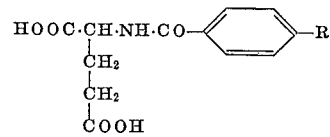

in which R represents a hydrogen atom or a nitro group serve as excellent resolving agents.

In accordance with the present invention, mixtures of L- and D-α-amino-ε-caprolactam can be resolved into their optical isomers with very high efficiency, by treating such mixtures with the aforementioned derivatives of D- or L-glutamic acid in a homogeneous liquid medium containing at least 90 vol. percent of at least one solvent selected from the group consisting of water, aliphatic alcohols of 1–4 carbon atoms, acetone and ethylene glycol.

In the present specification, the term "mixtures of L- and D-α-amino-ε-caprolactam" is not limited to a racemic compound consisting of equal parts of L- and D-α-amino-ε-caprolactam, but is inclusive of mixtures containing more than equal parts of either of its optical isomers. Hereinafter, such mixtures will be conveniently referred to as "D, L-$NH_2$—CL mixture," and L-optical isomer thereof, as "L-$NH_2$—CL," and D-optical isomer thereof, as "D-$NH_2$—CL."

Examples of the derivatives of glutamic acid useful as the optical resolving agent of D, L-$NH_2$—CL mixtures in accordance with the invention include:

N-benzoyl-L-glutamic acid
N-benzoyl-D-glutamic acid
N-p-nitrobenzoyl-L-glutamic acid, and
N-p-nitrobenzoyl-D-glutamic acid.

Among them, N-p-nitrobenzoyl-L-glutamic acid and N-p-nitrobenzoyl-D-glutamic acid are particularly preferred.

As the solvent, water, aliphatic alcohols of 1–4 carbon atoms, acetone and ethylene glycol can be used, the preferred solvents being water, methanol, ethanol, or mixtures thereof at any optional ratio. More than one of the aforementioned solvents can be optionally used as mixed solvents, and, furthermore, any homogeneous liquid medium containing at least 90 vol. percent of at least one of the foregoing solvents may be used as the solvent. For example, water-miscible organic solvents such as methyl ethyl ketone, methyl isobutyl ketone, amyl alcohol, hexyl alcohol, propylene glycol, glycerine, dioxane, tetrahydrofuran, dimethylsulfoxide, dimethylformaide, etc., may be mixed in an amount of less than 10 vol. percent with water, the aforesaid aliphatic alcohols, acetone, and ethylene glycol, or with mixtures of more than one of the named solvents, and mixtures can be used for the subject resolution. While hydrophobic organic solvents, for example, such as benzene, toluene, o-, m-, and p-xylene, ethyl benzene, kerosene, ethyl ether, petroleum ether, etc., cannot be used mixed with water alone, they may be used as mixed solvents with any of the specified aliphatic alcohols, acetone or ethylene glycol, or their mixtures, in an amount of less than 10 vol. percent. Those mixed solvents may further contain water, within a range that will form a homogeneous solution.

In short, any mixed solvent can be used as the resolving solvent of the present invention, as long as it is a homogeneous liquid medium (or solution) containing at least 90 vol. percent of at least one member of the group consisting of water, aliphatic alcohols of 1-4 carbon atoms acetone and ethylene glycol.

Thus, in accordance with the invention, D,L-NH$_2$—CL mixtures can be optically resolved with simple operation and at high yields, into highly pure L-NH$_2$—CL and/or D-NH$_2$—CL, by treating D,L-NH$_2$—CL mixtures in the homogeneous liquid media containing at least 90 vol. percent of at least one solvent selected from the group consisting of water, aliphatic alcohols of 1-4 carbon atoms, acetone and ethylene glycol, with one of the derivatives of L- or D-glutamic acid of the following formula

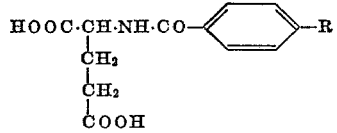

in which R represents a hydrogen atom or a nitro group (—NO$_2$), to precipitate a difficulty soluble salt consisting of L-or D-NH$_2$—CL and the derivative of an optically active glutamic acid, separating the difficulty soluble salt from the liquid media containing an easily soluble salt of L- or D-NH$_2$—CL and the glutamic acid derivative in accordance with any accepted practice, and thereafter decomposing the difficulty soluble salt and/or the easily soluble salt recovered from the liquid media.

Hereinafter the process of this invention will be explained in further details.

According to the invention, in order to treat a D,L-NH$_2$—CL mixture with derivative of an optically active (L- or D-) glutamic acid in the solvent, two solutions of the solvent each dissolving D,L-NH$_2$—CL mixture and the glutamic acid derivative therein respectively may be mixed, otherwise the mixture and the derivative may be added to the solvent and dissolved one after the other, the order of the addition being optional. It is also permissible to add a salt of D,L-NH$_2$—CL mixture and the derivative of an optically active, i.e., L- or D-, glutamic acid formed in advance, to the solvent.

A suitable amount of the derivative of an optically active glutamic acid, i.e., the resolving agent, to be used is at least 0.5 mol, preferably 0.8–1.3 mols, per mol of the D,L-NH$_2$—CL mixture used.

When the derivative of L- or D-glutamic acid is reacted as the resolving agent with D,L-NH$_2$—CL mixture in the aforesaid solvent, the greatest part of (A) A salt consisting of L-NH$_2$—CL and L-glutamic acid derivative, or (B) A salt consisting of D-NH$_2$—CL and D-glutamic acid derivative is precipitated as a difficultly soluble salt, and the greatest part of (C) A salt consisting D-NH$_2$—CL and L-glutamic acid derivative, or (D) A salt consisting of L-NH$_2$—CL and D-glutamic acid derivative is dissolved in the solvent as an easily soluble salt. That is, if one of the derivatives of L-glutamic acid is used as the resolving agent, (A) and (C) are formed, and if one of the derivatives of D-glutamic acid is used, (B) and (D) are formed.

These difficulty soluble and optically active salts; (A) and (B) thus obtained are in the form of needle-like crystal, and can be readily separated from the solvent by any of conventional means for solid-liquid separation such as filtration, centrifugation, etc.

In accordance with the process of this invention, a pair of L-NH$_2$—CL and the derivative of L-glutamic acid, or a pair of D-NH$_2$—CL and the derivative of D-glutamic acid can be obtained respectively by splitting either the salt (A), i.e., salt of L-NH$_2$—CL and the derivative of L-glutamic acid, or the salt (B), i.e., salt of D-NH$_2$—CL and the derivative of D-glutamic acid, each separated from the solvent as the difficulty soluble, and optically active salt as mentioned above, by any suitable means.

Similarly, by splitting the easily soluble salt; (C) or (D) in the mother liquor remaining after the recovery of the difficulty soluble, and optically active salt; (A) or (B) as it is, or by splitting the same as separated from the said liquor by further concentration and/or cooling the mother liquor, a pair of D-NH$_2$—CL and the derivative of L-glutamic acid, or a pair of L-NH$_2$—CL and the derivative of D-glutamic acid, can be recovered.

According to the process of this invention, L-NH$_2$—CL or D-NH$_2$—CL of sufficiently high optical purity can be obtained only through the resolution producer aforementioned, but, if desired, the purity can be further raised by recrystallizing the difficultly soluble salt; (A) or (B) separated as above in the solvent.

In a preferred embodiment of the invention,

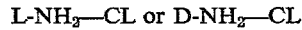

with excellent purity can be obtained at high yield, by using methanol, methanol-water mixtures, ethanol, or ethanol-water mixtures (if mixtures, methanol or ethanol content is at least 40 wt. percent, preferably at least 60 wt. percent) as the resolving solvent; and using N-p-nitrobenzoyl-L-glutamic acid or N-p-nitrobenzoyl-D-glutamic acid as the resolving agent; and controlling the ratio of the resolving agent and the D, L-NH$_2$—CL mixture resolved against the solvent within the range of the following formula;

$$2.5C \leqq X/Y \leqq 7.0C \qquad (1)$$

in which

X is a value of the molar number of the least of the D, L-NH$_2$—CL mixture and the glutamic acid derivative (if they are present in equimolar amounts, molar number of either one component), multiplied by 424.4 (gram-mol of the salt formed between them), Y is a value of the amount (milliliter) of the solvent (methanol, methanol-water mixtures, ethanol, or ethanol-water mixtures) divided by 100, and C is a value of the amount (gram) of the salt of D,

mixture and either of N-p-nitrobenzoyl-L-glutamic acid or N-p-nitrobenzoyl-D-glutamic acid that is soluble in 100 ml. of the solvent under the saturated concentration at the specific temperature employed for the optical resolution of this invention.

The above embodiment is also preferred from an operational standpoint, because the separation of the difficultly soluble salt; (A) or (B) is extremely facilitated.

Also still better results can be obtained in the above embodiment by controlling the ratio of resolving agent and D, L-NH$_2$—CL mixture against the solvent within the range of the following formula $$2.5C \leqq X/Y \leqq 6.0C \qquad (2)$$

in which X, Y and C have the same significations as defined in the above.

In practicing the optical resolution of the invention, normally the less the solubility ratio ($X/Y \cdot C$) of the salt of L- or D-NH$_2$—CL and the derivative of L- or D-glutamic acid against the solvent, the more solvent is required, and the more the amount of the precipitating salt is decreased, but the optical purity of the product is improved. Conversely, the more the solubility ratio, the more salt precipitates, but the optical purity of the product tends to be deteriorated. Accordingly, it is preferred to suitably determine the relative quantities of reactants and solvent in accordance with the type of solvent, the resolving agent, and the L- or D-$NH_2$—CL mixture to be used.

Consequently, it is appropriate practice to determine the quantitative ratios among the solvent, the $$D, L-NH_2—CL$$

mixture, and the resolving agent, to validate the foregoing Formula 1, preferably Formula 2, when methanol, ethanol, or a mixture of either alcohol with water, is used as the solvent. If, in Formula 1 or 2, $X/Y$ is lower than 2.5C, the amount of precipitating salt becomes too little or even nil. Whereas, if $X/Y$ is greater than 6.0C, particularly greater than 7.0C, the optical purity of the product becomes objectionably low. It is preferred, therefore, to control $X/Y$ so that the value may satisfy Formula 1, particularly Formula 2, inter alia, Formula 3 below:

$$3.0C \leq X/Y \leq 5.5C \qquad (3)$$

By so doing the difficultly soluble salt; (A) or (B) precipitates in the form of needle-like crystals, which can be easily separated from the resolving solvent by any conventional means for solid-liquid separation, such as filtration, centrifugation, etc. Especially when the solvent contains at least 80 wt. percent of methanol, the reaction mixture takes the form of an excellent slurry, extremely facilitating its separating procedure and enabling a continuous operation.

The precipitation of the difficultly soluble salt from the resolving solvent can be effected at temperatures ranging from the solidifying point to the boiling point of the solvent, but the preferred temperature range from a practical standpoint is from 20° C. to the boiling point of methanol or ethanol, particularly 20°–60° C.

The difficultly soluble salt; (A) or (B), or the easily soluble salt; (C) or (D) thus separated, can be split by any known means, and thereby L- or D-$NH_2$—CL and the derivative of L- or D-glutamic acid can be obtained.

As the preferred method of decomposition, the difficultly soluble salt; (A) or (B), or the easily soluble salt; (C) or (D) thus separated, may be (i) treated with a hydrohalic acid in an aqueous medium, or (ii) contacted with a cation exchange resin containing sulfonic acid groups, also in an aqueous medium. With such practice, the decomposition of these salts into L- or D-$NH_2$—CL and the derivatives of L- or D-glutamic acid can be performed very advantageously.

The characteristic advantages in the use of hydrohalic acid as in (i) above are as follows.

(1) The treating solvent may be water, which need not be recovered.

(2) The treating temperature may be low, inducing no objectionable side reactions such as racemisation, hydrolysis, etc.

(3) Separation of the hydrohalide of L- or $$D-NH_2—CL$$

is easy, because the derivatives of L- or D-glutamic acid used as the resolving agent are precipitated.

Whereas, it is also permissible to use as the solvent for the salt-decomposition using a hydrohalic acid, any aqueous solution containing a hydrophilic organic solvent such as methanol, ethanol, etc., to such an extent as will not interfere with the precipitation of the resolving agent (the derivatives of L- or D-glutamic acid).

As the hydrochalic acid, hydrochloric acid and hydrobromic acid are most preferred, and can be added into the salt-treating medium either in a gaseous form, or as an aqueous solution. Preferred amount of such a hydrohalic acid to be used is the sum of the amount of the hydrochalic acid equimolar to the optically active L- or D-$NH_2$—CL component in the salt plus the amount of the same acid required for reducing the pH of the treating solution to 1. Although the salts can be split only by the use of the hydrohalic acid equimolar to the optically active L- or D-$NH_2$—CL component, the resulting hydrohalide of L- or D-NH—$_2$CL and the derivatives of L- or D-glutamic acid as the resolving agent will both remain as dissolved in the system and therefore are difficult to be separated. When using more than the equimolar amount of a hydrohalic acid to control the pH of the treating solution approximately to 1, the solubility of the resolving agent, i.e., the derivatives of L- or D-glutamic acid, is lowered to allow its precipitation, thereby facilitating the separation of the two components. If a still larger excess of the hydrohalic acid is used, the pH is lowered below 1, and hydrolysis of the derivatives of L- or D-glutamic acid may take place. Furthermore, since the hydrochalic acid is normally not recovered, use of an unnecessarily large amount thereof is economically disadvantageous. Also when the salts are allowed to stand for a prolonged period of time at high temperatures in the presence of hte hydrohalic acid, objectionable side reactions such as racemization or hydrolysis of the optically active $NH_2$—CL are likely induced. Therefore, the decomposition treatment should be performed at temperatures not higher than 80° C., preferably not higher than 40° C. In the treatment, the salt may be first dissolved in an aqueous medium and then added with hydrohalic acid, followed by stirring; or an aqueous solution containing hydrohalic acid may be added to the salt, and agitated. The order of the addition may be reversed. If the system is agitated at room temperature, a treating time of approximately an hour is sufficient. Upon mechanical separation of the resolving agent precipitated accompanying the decomposition of the salt, the intended hydrohalide of optically active $NH_2$—CL is obtained in the form of solution. The solution then is condensed and purified in the accepted manner to isolate the hydrochalide of $NH_2$—CL.

The decomposition method using a cation exchange resing containing sulfonic acid groups as (ii) above is charterized by the following:

(1) Because the optically active salt; (A), (B), (C), or (D) is decomposed by a cation exchange resin containing sulfonic acid groups and only the optically active L- or D-$NH_2$—CL component of the two components of the salt is absorbed with the resin, which cannot be eluted with aqueous media, the salt can be completely split in the two components.

Consequently, highly pure L- or D-$NH_2$—CL or a mineral acid salt thereof, and the derivatives of L- or D-glutamic acid as the resolving agent, can be separately produced almost quantitatively.

(2) Furthermore, by eluting the L- or D-$NH_2$—CL component with the above cation exchange resin using any strongly acidic mineral acid, a salt of the corresponding mineral acid of L- or D-$NH_2$—CL is obtained. The latter can be readily converted to an optically active lysine by any known hydrolytic method.

(3) If the L- or D-$NH_2$—CL absorbed with the cation exchange resin is eluted using an aqueous solution of a volatile inorganic base, L- or D-$NH_2$—CL can be obtained in free form. The component which is not intended as a final product, for example, D-$NH_2$—CL, can be readily converted to racemic D, L-$NH_2$—CL mixture by known manner of racemization.

(4) Because absolutely no mineral acid or inorganic base is mixed into the recovered resolving agent, i.e., the derivatives of L- or D-glutamic acid, the agent can be recirculated to be repetitively used for the salt formation with D, L-$NH_2$—CL mixture.

(5) The decomposition procedure is simple.

In the above decomposition method employing the cation exchange resin, the aqueous media similar to those useful in the aforesaid hydrochalic acid method can also be used, the preferred medium being water.

In certain occasions, however, when a mixed solvent containing methanol or ethanol is used for the preparation of the aforesaid salt; (A), (B), (C) or (D), and the salt may be preferably treated in solution form, or in the state not completely dried but still containing residual mixed solvent, an aqueous solvent containing methanol or ethanol may be used.

As the cation exchange resin containing sulfonic acid groups ($-SO_3H$), any known cation exchange resin contaiinng sulfonic acid groups can be used in acidic form (H-form), the composition of resin matrix and the degree of crosslinkage thereof not being critical. Particularly commercial polystyrene-type cation exchange resins containing sulfonic acid groups produced on industrial scales are conveniently used, such resins including standard type resins such as "Diaion SK—1A, SK—1B, SK–110" (products of Mitsubishi Kasei Co., Japan), "Amberlite 120, 122" (products of Rohm & Haas Co., U.S.A.), "Dowex 50W" (product of Dow Chemicals, Inc.) as well as porous type resins such as "Diaion PK–208," "Amberlite 200, XE–100," etc.

In the treatment of the optically active salt; (A), (B), (C), or (D), such a cation exchange resin as above-named must be used in acidic form (H-form). When the resin is not in acidic form, e.g., the sodium form (Na-form), it should be regenerated to acidic form by a treatment with mineral acid (for example, aqueous hydrochloric acid, aqueous sulfuric acid, etc.) and then thoroughly washed with water before use. Strictly speaking, the amount of use of such a resin is variable depending on such factors as the method of contact, degree of regeneration of the resin, temperature, etc., but normally, it should be used such that the total exchange capacity of the employed resin calculated from the exchange capacity per unit volume of the resin (the latter can be determined by an ordinary exchange capacity measurement) should exceed the equivalent of the optically active salt to be treated.

While the use of a large excess of the cation exchange resin has no detrimental effect, such large excess use will require an unnecessarily large amount of aqueous mineral acid or base in the elution step of L- or D-$NH_2$—CL and in the regeneration step of the resin. Therefore, a suitable amount of the resin to be used is within such range that its total exchange capacity is 1 to 10 times the equivalent amount of the salt to be treated.

When the L- or D-$NH_2$—CL is exposed to high temperatures for a prolonged period of time in the concurrent presence of acidic form cation exchange resin, objectionable racemization or hydrolysis thereof may occur. Whereas, if the cation exchange resin treatment is performed at excessively low temperatures, the aqueous media may freeze. From such considerations, the suitable treating temperature is not higher than 100° C., preferably within the range of 60°-0° C.

The decomposition method using the cation exchange resin may be practiced either in fluidized system in which the optically active salt is dissolved in an aqueous solvent and passed through a column packed with the cation exchange resin, or in a batch system in which the cation exchange resin is added to a solution of the optically active salt and stirred, whereupon the salt is decomposed into its two constituents.

According to the process of this invention, D,

L-$NH_2$—CL mixtures can be resolved into highly pure and optically active L- or D-$CH_2$—CL at high yield, using the relatively inexpensive optical resolving agent and through simple procedures.

The resolved L-$NH_2$—CL or hydrohalide thereof can be readily hydrolyzed and converted to L-lysine. On the other hand, D-$NH_2$—CL can be racemized, further optically resolved in accordance with the subject process, and similarly converted to L-lysine too.

Hereinafter the subject process will be explained with reference to working examples, in which the optical purity of L- or D-$NH_2$—CL or their mixtures and percentile L-form content were calculated from degree of specific rotation of 1 N aqueous hydrochloric acid solution of hydrochloride of the foregoing, and the yield was calculated under the assumption that the salt is composed of each molar equivalent of the components.

[I] EXAMPLES OF OPTICAL RESOLUTION USING N-p-NITROBENZOYL - L - GLUTAMIC ACID AND N-p-NITROBENZOYL-D-GLUTAMIC ACID

Example 1

(A) 1.8 grams of racemic D,L-$NH_2$—CL mixture (optical purity, 50%) was dissolved in 25 ml. of water, and into which further 44.0 g. of N-p-nitrobenzoyl-L-glutamic acid were added and dissolved, followed by stirring for 2 hours at 0° C. A large quantity of a crystalline, difficulty soluble salt of L- and D-$NH_2$—CL with N-p-nitrobenzoyl-L-glutamic acid was precipitated, which was separated by filtration under suction, washed with a minor amount of water, and dried under reduced pressure to give 2.1 g. of crude crystals.The crystallization yield was 36%. The product had a melting point of 186° C., and specific rotatory power, $[\alpha]_D^{22}=-0.8°$ (c.=3.0, water). 0.7 gram of this difficultly soluble salt was decomposed with hydrochloric acid by the method described in later-appearing Examples 23. Some 0.23 g. of hydrochloride of

D,L-$NH_2$—CL mixture containing 75% of L-form (yield: 10%) was obtained.

(B) 1.3 grams of the above difficulty soluble salt were recrystallized in 12 ml. of hot water, to produce 0.8 g. of needle-like crystal (crystallization yield of the recrystallization was 62%). Melting point 193° C., elementary analysis values: C, 50.62; H, 5.55 [theoretical values as for $C_{18}H_{24}N_4O_8$(424.40): C, 50.94; H, 5.70], $[\alpha]_D^{22}=-2.8$ (c.=1.8, water). All of the crystalline product was decomposed with hydrochloric acid by the method described in later-appearing Example 21, to recover 0.22 g. of hydrochloride of L-$NH_2$—CL (yield: 10%, the yield from the total difficulty soluble salt: 16%). The product had a specific rotatory power, $[\alpha]_D^{22}=-25°$ (c.=1.6, 1 N hydrochloric acid), and an optical purity of 100%.

(C) The filtrate remaining after separation of the difficultly soluble salt, the mother liquor of recrystallization, and the washing were combined, producing an aqueous solution containing 4.3 g. of an easily soluble salt. The solution was decomposed by the method of later appearing Example 32, to produce 1.58 g. of hydrochloride of

D,L-$NH_2$—CL mixture of D-form content 66% (yield: 69%).

Example 2

1.8 grams of an equimolar mixture of L- and

D-$NH_2$—CL were dissolved in 10 ml. of water, and into which further 4.0 g. of N-p-nitrobenzoyl-L-glutamic acid were added and dissolved, followed by standing for 3 hours at 4° C. A crystalline, difficulty soluble salt was precipitated. Ten (10) ml. of water were added to the system, stirred for 5 minutes, and filtered. The separated precipitate was washed with a minor amount of water and dried. The yield of the difficultly soluble salt was 2.8 g. (crystallization yield: 49%), and L-form content of D,L-$NH_2$—CL mixture in the difficultly soluble salt was 67%. Then the difficultly soluble salt was recrystallized and decomposed in a manner of Example 1, to produce 0.32 g. of hydrochloride of L-$NH_2$—CL of 100% optical purity (yield: 14%).

Separately, the filtrate and the washing were together condensed and dried, and the resulting 1.5 g. of an easily soluble salt was similarly treated with hydrochloric acid to be decomposed. Some 0.43 g. of hydrochloride of D,L-NH$_2$—CL mixture containing 78% of D-form was obtained (yield: 37%).

Example 3

1.8 grams of an equimolar mixture of L- and

D-NH$_2$—CL were dissolved in 17 ml. of water, and to which 4.0 g. of N-p-nitrobenzoyl-L-glutamic acid were added. Through procedures similar to those of Example 1, 3.2 g. of crude crystal of a difficultly soluble salt were obtained, with a crystallization yield of 55%. One (1.0) g. of the crude crystal was treated with hydrochloric acid to be decomposed in the manner described in later-appearing Example 21. As a result, 0.34 g. of hydrochloride of D,L-NH$_2$—CL mixture containing 69% of L-form was obtained (yield: 15%).

Upon recrystallization of 2.2 g. of the above crude crystal from 15 ml. of hot water, 0.92 g. of needle-like crystal was obtained (crystallization yield: 43%). The all crystalline product was similarly treated with hydrochloric acid and decomposed. Thus 0.27 g. of hydrochloride of L-NH$_2$—CL containing 95% of L-form was obtained (yield: 12%).

The filtrate remaining after separation of crude crystal, the mother liquor of recrystallization and the washing were combined, condensed and dried to produce 3.9 g. of an easily soluble salt, which was similarly decomposed. Thus, 1.1 g. of hydrochloride of D,L-NH$_2$—CL mixture containing 63% of D-form was obtained (yield: 47%).

Example 4

1.8 grams of an equimolar mixture of L- and

D-NH$_2$—CL were dissolved in 19 ml. of water, and with which a solution of 4.1 g. of N-p-nitrobenzoyl-L-glutamic acid dissolved in 28 ml. of water mixed, by stirring for 2 hours at 30° C. The precipitated difficultly soluble salt was filtered and dried to yield 2.18 g. of crude crystals, the crystallization yield being 37%. All of the crystals were decomposed with a resin by the method described in later given Example 28, to produce 0.83 g. of hydrochloride of D, L-NH$_2$—CL mixture containing 88% of L-form.

Example 5

(A) 1.8 g. of an equimolar mixture of L- and D-NH$_2$—CL were dissolved in 17 ml. of water, and to which 4.0 g. of N-p-nitrobenzoyl-D-glutamic acid were added, followed by the procedures similar to Example 1, to produce 3.4 g. of a crude, crystalline difficultly soluble salt, with a crystallization yield of 59%. 1.0 gram of the crystal was decomposed with hydrochloric acid by the method described in later given Example 21, and 0.39 g. of hydrochloride of D,L-NH$_2$—CL mixture containing 71% of D-form was obtained (yield: 17%).

(B) 2.4 grams of the above crude crystal were recrystallized in 17 ml. of hot water, yielding 1.5 g. of needle-like crystals at the crystallization yield of 63%. All of the needle-like crystals were decomposed with hydrochloric acid by the method described in later-appearing Example 22, to produce 0.40 g. of hydrochloride of D-NH$_2$—CL (yield: 17%, yield from total of the difficultly soluble salt, 24%). The optical purity of the D-form was 100%.

Example 6

1.0 gram of an equimolar mixture of L- and

D-NH$_2$—CL was added to 105 ml. of methanol containing 2.3 g. of N-p-nitrobenzoyl-L-glutamic acid dissolved therein, and dissolved under stirring. After the system was allowed to stand for approximately 5 minutes at room temperature, needle-like crystals started to precipitate. After continuous stirring for an hour, the precipitated crystals were filtered off, washed with a minor amount of methanol, and dried under reduced pressure to recover 1.3 g. of a crude, crystalline difficultly soluble salt. The crystallization yield was 39%. All of the crude crystals were decomposed with a resin by the method described in Example 32, to produce 0.50 g. of hydrochloride of D,L-NH$_2$—CL mixture containing 98% of L-form (yield 39%).

The filtrate remaining after separation of the crude crystals, and the washing were combined, condensed and dried to separate 2.0 g. of an easily soluble salt, which was resin-decomposed by the method of Example 32. Thus 0.77 g. of hydrochloride of D,L-NH$_2$—CL mixture containing 82% of D-form was obtained (yield: 60%).

Example 7

1.0 gram of an equimolar mixture of L- and

D-NH$_2$—CL was dissolved in 16 ml. of a mixed solvent composed of 94 wt. percent of methanol and 6 wt. percent of water, and the solution was mixed with another solution composed of 2.3 g. of N-p-nitrobenzoyl-L-glutamic acid and 40 ml. of the above mixed solvent, followed by stirring for 2 hours at 30° C. Thus 1.4 g. of a crystalline, difficultly soluble salt were obtained at a crystallization yield of 42%, which was resin-decomposed by the method described later in Example 34, and eluted with aqueous ammonia. Thus 0.42 g. of L-NH$_2$—CL was obtained (yield: 42%, yield from L-form, 84%). The L-form had an optical purity of 100%.

The filtrate and the washing were together condensed and dried, and the resulting 1.9 g. of an easily soluble salt were resin-decomposed by the method of later-appearing Example 34, to produce 0.57 g. of D,L-NH$_2$—CL mixture containing 86% of D-form (yield: 57%).

Example 8

1.8 grams of an equimolar mixture of L- and

D-NH$_2$—CL were dissolved in 8 ml. of a mixed solvent composed of 50 wt. percent of methanol and 50 wt. percent of water. The solution was mixed with another solution composed of 4.0 g. of N-p-nitrobenzoyl-D-glutamic acid and 20 ml. of the above mixed solvent. Through the procedures similar to foregoing Example 6 performed at 0° C., 3.2 g. of a crystalline, difficultly soluble salt were recovered at the crystallization yield of 55%. 1.2 grams of crystals were decomposed with hydrochloric acid by the method of Example 25, to produce 0.34 g. of hydrochloride of D,L-NH$_2$—CL mixture containing 85% of D-form (yield: 15%). The remaining 2.0 g. of the crystals were recrystallized in 20 ml. of the above-specified mixed solvent, to yield 1.3 g. of needle-like crystals at a crystallization yield of 65%. All of the needle-like crystals were decomposed with a resin by the method of later given Example 28. Thus 0.55 g. of hydrochloride of D-NH$_2$—CL was obtained (yield: 24%, yield to total of the difficultly soluble salt: 38%). The optical purity of D-form in the hydrochloride was 98%.

Example 9

In a 3-necked flask equipped with a mechanical stirrer and a thermometer, a solution formed by dissolving 2.3 g. of N-p-nitrobenzoyl-L-glutamic acid in 400 ml. of ethanol was poured, and the flask was immersed in a thermostated bath to be maintained at a temperature of 15° C. Separately, 1.0 g. of an equimolar mixture of L- and D-NH$_2$—CL (optical purity: 50%) was dissolved in 100 ml. of ethanol and also maintained at 15° C. The latter solution was added into the former solution in the flask, followed by an hour's stirring. Thus precipitated crystals were filtered and dried under reduced pressure, to separate 2.2 g. of a crystalline, difficultly soluble salt, at a crystallization yield of 67%.

The crystalline salt was decomposed with hydrochloric acid by the method of later-appearing Example 27, to produce 0.75 g. of hydrochloride of D,L-NH$_2$—CL mixture containing 70% of L-form (yield: 58%).

Example 10

0.82 gram of an equimolar mixture of L- and

D-NH$_2$—CL was dissolved in 19 ml. of a mixed solvent composed of 95 wt. percent of ethanol and 5 wt. percent of water, and to the solution 1.9 g. of N-p-nitrobenzoyl-L-glutamic acid were added, and dissolved under stirring. Through the procedures similar to above Example 9 performed at 30° C., 2.3 g. of a crystalline, difficultly soluble salt were obtained, at a crystallization yield of 85%. The salt was decomposed with hydrogen chloride by the method of Example 24, to provide 0.78 g. of hydrochloride of D,L-NH$_2$—CL mixture containing 66% of L-form (yield: 74%).

Separately, the filtrate and the washing were condensed and dried, and the resulting 0.44 g. of an easily soluble salt was similarly decomposed to produce 0.17 g. of hydrochloride of D,L-NH$_2$—CL mixture containing 75% of D-form (yield: 16%).

Example 11

0.8 gram of an equimolar mixture of L- and D-NH$_2$—CL was dissolved in 100 ml. of a mixed solvent composed of 90 wt. percent of ethanol and 10 wt. percent of water, and the solution was mixed with another solution composed of 1.7 g. of N-p-nitrobenzoyl-L-glutamic acid dissolved in 220 ml. of the above mixed solvent. Through the procedures similar to aforesaid Example 9 performed at 30° C., 0.8 g. of a crystalline, difficulty soluble salt was recovered, at a crystallization yield of 36%. The salt was resin-decomposed by the method of later given Example 28, a produce 0.37 g. of hydrochloride of L-NH$_2$—CL (yield: 36%), which had an optical purity of 98%.

Separately, the filtrate and the washing were condensed and dried, and resulting 1.7 g. of an easily soluble salt was similarly decomposed to produce 0.56 g. of hydrochloride of D,L-NH$_2$—CL mixture containing 89% of D-form (yield: 64%).

Example 12

0.9 gram of an equimolar mixture of L- and D-NH$_2$—CL (optical purity: 50%) was dissolved in 4 ml. of a mixed solvent composed of 80 wt. percent of ethanol and 20 wt. percent of water, and the solution was mixed with another solution formed by dissolving 2.0 g. of N-p-nitrobenzoyl-L-glutamic acid in 10 ml. of the above mixed solvent, followed by standing at room temperature. Precipitation of needle-like crystals of a difficulty soluble salt started approximately 5 minutes thereafter, and after standing for 2 hours the precipitated crystals were filtered off, washed with a minor amount of the above mixed solvent, and dried under reduced pressure. Thus 2.1 g. of the crystalline salt were obtained with a crystallization yield of 71%.

All of the difficulty soluble salt was recrystallized from 30 ml. of a mixed solvent composed of 60 wt. percent of ethanol and 40 wt. percent of water, at 70° C., to provide 0.90 g. of long, needle-like crystals at a crystallization yield of 43%. The crystals were decomposed by the method of later given Example 28, and 0.45 g. of hydrochloride of L-NH$_2$—CL was obtained (yield: 39%). The optical purity of the L-form thereof was 90%.

The filtrate remaining after separation of the crude crystals, the mother liquor of recrystallization, and the washing were combined, condensed and dried, and the resulting 2.0 g. of an easily soluble salt was similarly decomposed to yield 0.57 g. of hydrochloride of D-NH$_2$—CL (yield: 49%). The optical purity of the D-form was 95%.

Example 13

2.3 grams of N-p-nitrobenzoyl-L-glutamic acid were dissolved in 30 ml. of methanol-ethanol-water mixed solvent (composition by weight ratio: 45:45:10), and the solution was mixed with another solution formed by dissolving 1.0 g. of an equimolar mixture of D,L-NH$_2$—CL in 10 ml. of the above-specified mixed solvent. Through the procedures similar to those described in the foregoing Example 9 with the exception that the temperature of the thermostated bath was made 30° C., 2.6 g. of a difficulty soluble salt were obtained at a crystallization yield of 78%.

The salt was decomposed by a treatment with a resin by the method of Example 35, to produce 0.93 g. of hydrochloride of D,L-NH$_2$—CL mixture containing 63% of L-form (yield: 93%).

Example 14

2.3 grams of N-p-nitrobenzoyl-L-glutamic acid were dissolved in 43 ml. of a methanol-acetone-water mixed solvent (composition by weight ratio: 80:10:10), and to the obtained solution 1.0 g. of L- and D-NH$_2$—CL mixture was added and dissolved, followed by stirring 30° C. After approximately 15 minutes of stirring, a difficulty soluble salt started to precipitate. After additional stirring for an hour, the salt was centrifuged off and then dried, producing 1.3 g. of salt at a crystallization yield of 39%.

The salt was decomposed by a resin treatment according to the method of later appearing Example 34, into 0.91 g. of N-p-nitrobenzoyl-L-glutamic acid and 0.46 g. of D,L-NH$_2$—CL mixture containing 87% of L-form (yield: 36%).

Example 15

2.3 grams of N-p-nitrobenzoyl-L-glutamic acid were dissolved in 45 ml. of an ethanol-water-toluene mixed solvent (composition by weight ratio: 92:6:2). This solution was mixed with another solution formed by dissolving 1.0 g. of an equimolar mixture of L- and D-NH$_2$—CL in 15 ml. of the above mixed solvent, and the mixture was rapidly stirred at 30° C. for an hour, followed by the procedures described in the foregoing Example 9. Thus 2.5 g. of a crystalline, difficulty soluble salt were obtained at a crystallization yield of 76%.

The salt was decomposed by the method described in later-given Example 23, and 0.79 g. of hydrochloride of D,L-NH$_2$—CL mixture containing 64% of L-form was obtained (yield: 61%).

Example 16

2.3 grams of N-p-nitrobenzoyl-D-glutamic acid were suspended in 100 ml. of isopropanol. Separately, 1.0 g. of an equimolar mixture of L- and D-NH$_2$—CL was dissolved in 50 ml. of isopropanol. The suspension and the solution were subjected to the procedures similar to those of the foregoing Example 9 at 30° C., and 2.9 g. of a crystalline, difficulty soluble salt were obtained at a crystallization yield of 88%.

The salt was decomposed by the method of Example 28, to provide 1.15 g. of hydrochloride of D,L-NH$_2$—CL mixture containing 57% of D-form (yield: 88%).

Example 17

A solution formed by dissolving 2.3 g. of N-p-nitrobenzoyl-L-glutamic acid in 80 ml. of a mixed solvent composed of 80 wt. percent of isopropanol and 20 wt. percent of water and another solution formed by dissolving 1.0 g. of an equimolar mixture of L- and D-NH$_2$—CL in 20 ml. of the mixed solvent were processed as described in the foregoing Example 9 at 30° C. Thus 1.4 g. of a crystalline, difficulty soluble salt were obtained at a crystallization yield of 42%.

The salt was decomposed by the method of later appearing Example 28 and eluted with 70 ml. of 2 N hydrochloride acid. As a result 0.52 g. of hydrochloride of L-NH$_2$—CL was obtained (yield: 40%). The optical purity of L-form was 99%.

Example 18

A solution prepared by dissolving 1.15 g. of N-p-nitrobenzoyl-L-glutamic acid in 70 ml. of a n-butanol-water mixed solvent (90:10 by weight) and another solution prepared by dissolving 0.5 g. of an equimolar mixture of L- and D-NH$_2$—CL in 38 ml. of the above mixed solvent were processed similarly to the foregoing Example 9 at 30° C. Thus 0.58 g. of a crystalline, difficulty soluble salt was obtained at a crystallization yield of 35%.

The salt was decomposed by the method of later given Example 28, to produce 0.22 g. of hydrochloride of L-NH$_2$—CL of 100% optical purity (yield: 34%).

Example 19

A solution prepared by dissolving 3.45 g. of N-p-nitrobenzoyl-L-glutamic acid in 80 ml. of an acetone-water mixed solvent (70:30 by weight) and another solution prepared by dissolving 1.5 g. of an equimolar mixture of L- and D-NH$_2$—CL (optical purity: 50%) in 20 ml. of the above mixed solvent were processed similarly to the foregoing Example 9 at 30° C. Thus 1.2 g. of a crystalline, difficultly soluble salt were obtained at a crystallization yield of 24%.

The salt was decomposed by the method of later given Example 23, to produce 0.43 g. of hydrochloride of L-NH$_2$—CL (yield: 22%). The optical purity of the L-form was 94%.

Example 20

A solution formed by dissolving 4.6 g. of N-p-nitrobenzoyl-L-glutamic acid in 30 ml. of an ethylene glycol-water mixed solvent (90:10 by weight) and another solution formed by dissolving 2.0 g. of an equimolar mixture of L- and D-NH$_2$—CL in 10 ml. of the above mixed solvent were processed similarly to the foregoing Example 9 at 30° C. Thus 3.3 g. of a crystalline, difficultly soluble salt were obtained at a crystallization yield of 50%. The salt was decomposed by the method of later-appearing Example 28, to produce 1.28 g. of hydrochloride of

D,L-NH$_2$—CL mixture containing 88% of L-form (yield: 50%).

[II] EXAMPLES OF DECOMPOSITION OF ISOMERIC SALTS WITH HYDROGEN HALIDE

Example 21

0.80 gram of the needle-like crystals obtained in (B) of the foregoing Example 1, i.e., the salt composed of L-NH$_2$—CL and N-p-nitrobenzoyl-L-glutamic acid, was dissolved in 5 ml. of 1 N hydrochloric acid and stirred at room temperature. Approximately 2-minutes thereafter, N-p-nitrobenzoyl-L-glutamic acid started to precipitate. An hour after the stirring began, the precipitate was filtered under suction to be removed. The filtrate was concentrated and dried to yield hydrochloride of L-NH$_2$—CL, which was still contaminated with a minor amount of N-p-nitrobenzoyl-L-glutamic acid. To the product, 5 ml. of an isopropanol solution containing 3 N hydrogen chloride were added and stirred for 30 minutes. The hydrochloride remaining undissolved was filtered, washed twice with each 2 ml. of isopropanol, and dried under reduced pressure. The yield of hydrochloride of L-NH$_2$—CL was 0.22 g. (yield: 71%). Melting point, 285° C. (decomposition), $[\alpha]_D^{22}=-25.0°$ (c.=1.6 1 N hydrochloric acid) [literature value: $[\alpha]_D^{22}=-24.5\pm1.2°$ (c.=3.2, 1 N hydrochloric acid)]. These data prove that the optical purity of the above hydrochloride is 100%, and no racemization took place during the above decomposition treatment.

Example 22

1.50 grams of the needle-like crystals obtained in (B) of the foregoing Example 5, i.e. the salt composed of D-HN$_2$—CL and N-p-nitrobenzoyl-D-glutamic acid, were dissolved in 10 ml. of 1 N hydrochloric acid, followed by the procedure similar to those described in above Example 21. Thus 0.40 g. of hydrochloride of D-NH$_2$—CL was obtained (yield: 68%). The optical purity of the D-form was 100%.

The filtered solid from the treating hydrochloric acid and the concentrate of the isopropanol solution were dried under reduced pressure, and were 1.03 g. of N-p-nitrobenzoyl-D-glutamic acid was recovered (yield: 100%).

Example 23

1.40 grams of the difficultly soluble salt of

D,L-NH$_2$—CL mixture with N-p-nitrobenzoyl-L-glutamic acid, as obtained in (A) of the foregoing Example 1 (M.P. 186° C., $[\alpha]_D^{22}=-0.8°$ (c.=3.0, water), were suspended in 8 ml. of water, and to which 2 ml. of 5 N hydrochloric acid were added to form a solution. The solution was treated in a manner similar to that described in above Example 21. Thus 0.46 g. of hydrochloride of D,L-NH$_2$—CL mixture containing 75% of L-form was obtained (yield: 84%).

Example 24

2.30 grams of the difficultly soluble salt of

D,L-NH$_2$—CL mixture with N-p-nitrobenzoyl-L-glutamic acid, as obtained in the foregoing Example 10, were suspended in 10 ml. of water, and into which hydrogen chloride gas was blown at room temperature, to reduce the pH of the solution to 1. Approximately 10 minutes thereafter, N-p-nitrobenzoyl-L-glutamic acid started to precipitate. After continuous stirring for 30 minutes, the mixture was treated similarly to the foregoing Example 21, to produce 0.78 g. of hydrochloride of D,L-NH$_2$—CL mixture containing 66% of L-form (yield: 87%).

Example 25

1.20 grams of the difficultly soluble salt of

D,L-NH$_2$—CL mixture with N-p-nitrobenzoyl-D-glutamic acid, as obtained in the foregoing Example 8, were dissolved in 8 ml. of 1 N hydrochloric acid at 40° C., followed by the treatments similar to those of the foregoing Example 21. Thus 0.34 g. of hydrochloride of D,L-NH$_2$—CL mixture containing 85% of D-form was obtained (yield: 73%).

Example 26

1.50 grams of the difficultly soluble salt of

D,L-NH$_2$—CL mixture with N-p-nitrobenzoyl-L-glutamic acid, as obtained in Example 11, were suspended in 10 ml. of water, and into which hydrogen bromide gas was passed at room temperature until the pH of the solution was reduced to 1, followed by an hour's stirring. Thereafter the precipitated N-p-nitrobenzoyl-L-glutamic acid was filtered. The filtrate was concentrated and dried to yield the hydrobromide of L-NH$_2$—CL, which was suspended in 10 ml. of an isopropanol solution containing 3.0 N hydrogen bromide, followed by the treatments similar to those of the foregoing Example 21. Thus 0.67 g. of hydrobromide of L-NH$_2$—CL was obtained (yield: 91%). The product had a specific rotatory power of $[\alpha]_D^{22}=-21.1°$ (c.=2.0, water), and an optical purity of 98%.

Example 27

2.2 grams of the crystalline, difficultly soluble salt obtained in accordance with the foregoing Example 9 were dissolved in 20 ml. of an aqueous solvent of 1 N hydrochloric acid containing 2 wt. percent thereof of methanol, and stirred at room temperature. Approximately 3 minutes thereafter, N-p-nitrobenzoyl-L-glutamic acid started to precipitate. After an hour's stirring, the precipitate was removed by suction filtration. The filtrate was concentrated and dried to provide hydrochloride of L-$NH_2$—CL which still contained a minor amount of N-p-nitrobenzoyl-L-glutamic acid. To the hydrochloride, 20 ml. of isopropanol were added and stirred for 30 minutes to extract the glutamic acid derivative. The hydrochloride remaining undissolved was recovered by filtration, washed twice with each 2 ml. of isopropanol, and dried under reduced pressure. Thus 0.75 g. of hydrochloride of D,L-$NH_2$—CL mixture containing 70% of L-form was obtained (yield: 88%).

[III] EXAMPLES OF DECOMPOSITION OF THE ISOMERIC SALTS USING CATION EXCHANGE RESINS CONTAINING SULFONIC ACID GROUPS

Example 28

1.52 grams of the difficultly soluble salt composed of L-$NH_2$—CL and N-p-nitrobenzoyl-L-glutamic acid as obtained in the foregoing Example 1 (B) were dissolved in 50 ml. of water. The solution obtained was passed through a resin column of 1.0 cm. in diameter and 16 cm. in height which was packed with 12 ml. of a cation exchange resin containing sulfonic acid groups (trade name: Diaion SK-1B). Then the column was washed with 75 ml. of water. From the effluent leaving the column and the washing, N-p-nitrobenzoyl-L-glutamic acid was recovered quantitatively.

Subsequently, the resin column was eluted and washed with 100 ml. of 1 N hydrochloric acid, and the eluent was concentrated under reduced pressure at 50° C., to produce 0.58 g. of hydrochloride of L-$NH_2$—CL (yield: 98%), which had a M.P. of 285° C. (decomp.) and $[\alpha] = -25.0°$ (c.=3.2, 1 N hydrochloric acid) literature value $[\alpha]_D^{22} = -24.5 \pm 1.2°$ (c.=3.2, 1 N hydrochloric acid). The characteristic values of the infrared absorption spectrum of the hydrochloride coincided with those of separately synthesized hydrochloride of D,L-$NH_2$—CL.

Example 29

1.84 grams of the difficultly soluble salt composed of D-$NH_2$—CL and N-p-nitrobenzoyl-D-glutamic acid as obtained in the foregoing Example 5(B) were dissolved in 50 ml. of water, and thereafter treated similarly to above Example 28. From the eluent with hydrochloric acid, 0.69 g. of hydrochloride of D-$NH_2$—CL was recovered (yield: 96%). The optical purity of the hydrochloride was 0%, while that as to the D-form was 100%.

Example 30

A mixture of 2.07 g. of a salt of L-$NH_2$—CL with N-p-nitrobenzoyl-L-glutamic acid and 0.69 g. of another salt of D-$NH_2$—CL with N-p-nitrobenzoyl-L-glutamic acid (optical purity of D,L-$NH_2$—CL contained in the mixture was 75%) were dissolved in 100 ml. of water, and passed through a resin column of 0.9 cm. in diameter and 22 cm. in height, which was packed with 15 ml. of a sulfonated cation exchange resin (trade name: Dowex 50W-X8), followed by the procedures similar to those of the above Example 28. From the hydrochloric acid eluent, 1.05 g. of hydrochloride of D,L-$NH_2$—CL mixture containing 75% of L-form were obtained (yield: 98%).

The resin column was further thoroughly washed with water until the pH of its washing became 5.0, and with which the operations of this example could be repeated with similar results.

Example 31

The same mixture of optically active, difficultly soluble salts as employed in above Example 30 (2.76 g.) was dissolved in 100 ml. of water, and passed through the same resin column employed in above Example 30. The resin column was thoroughly washed with water, and through which the aqueous solution as above-specified was passed again. With subsequent treatments identical with those of the foregoing Example 28 except that 250 ml. of 0.5 N hydrochloric acid was used for the elution, 2.12 g. of hydrochloride of D,L-$NH_2$—CL mixture containing 74% of L-form was obtained (yield: 99%).

Example 32

4.30 grams of the easily soluble salt of D,L-$NH_2$—CL with N-p-nitrobenzoyl-L-glutamic acid (D-form content in D,L-$NH_2$—CL: 66%), as obtained in the foregoing Example 1(C), were dissolved in 50 ml. of water. Forty (40) ml. of a cation exchange resin containing sulfonic acid groups (trade name: Amberlite 120) was suspended in 40 ml. of water, and the suspension was added to the first solution and stirred for 30 minutes. Then, the resin was separated by filtration, followed by washing with 50 ml. of water.

The same resin was washed with 300 ml. of 0.1 N hydrochloric acid 5 times. Upon concentration of the washings under reduced pressure, 1.58 g. of hydrochloride of D,L-$NH_2$—CL mixture containing 66% of D-form were obtained (yield: 95%).

Example 33

3.30 grams of the difficultly soluble salt as obtained in the foregoing Example 7 (L-form content of $NH_2$—CL: 100%) were dissolved in 120 ml. of water, and passed through a column of 1.0 cm. in diameter and 24 cm. in height which was packed with 18 ml. of a cation exchange resin containing sulfonic acid groups (trade name: Diaion PK–208). The column was washed with 160 ml. of water.

Further the resin column was eluted and washed with 400 ml. of 1 N hydrobromic acid. Upon concentration of the eluent under reduced pressure and drying, 1.54 g. of hydrobromide of L-$NH_2$—CL of 100% optical purity were obtained (yield: 95%).

Example 34

1.90 grams of the easily soluble salt obtained in the foregoing Example 7 (D-form content in $NH_2$—CL component: 86% were dissolved in 20 ml. of water, and passed through an acidic cation exchange resin column (trade name: Diaion PK%208, amount of resin: 6 ml., diameter and height of column: 1.0 cm. and 8 cm., respectively), and the column was washed with 60 ml. of warm water. Then the resin column was eluted and washed with 120 ml. of 10% aqueous ammonia. Upon concentration of the eluent under reduced pressure, 0.57 g. of D,L-$NH_2$—CL mixture (free form) containing 86% of D-form was recovered (yield: 99%).

Example 35

2.6 grams of the crystalline, difficultly soluble salt as obtained in the foregoing Example 13 were dissolved in 150 ml. of an aqueous solvent containing 25 wt. percent of methanol, followed by the treatments similar to those of the above Example 30. Thus, 0.93 g. of hydrochloride of D,L-$NH_2$—CL mixture containing 63% of L-form was obtained (yield: 92%).

Example 36

2.2 grams of the crystalline, difficultly soluble salt obtained as in the foregoing Example 9 were dissolved in 150 ml. of an aqueous solvent containing 20 wt. percent thereof of ethanol, followed by the procedures similar to those of the above Example 30. Thus, 0.81 g. of hydrochloride of D,L-$NH_2$—CL mixture containing 70% of L-form was obtained (yield: 95%).

(IV) EXAMPLES ILLUSTRATING THE CORRELATIONS BETWEEN AMOUNT OF D,L-$NH_2$—CL MIXTURE AND AMOUNT OF SOLVENT

Example 37

Into a 3-necked flask equipped with a mechanical stirrer and a thermometer, 23.0 g. (0.078 mol) of N-p-nitrobenzoyl-L-glutamic acid and 730 ml. of a solvent mixture consisting of 94 wt. percent of methanol and 6 wt. percent of water were poured, and immersed under stirring in a thermostated bath maintained at 25° C. to form a solution of resolving agent.

In another 3-necked flask similarly equipped with a stirrer and a thermometer, 10.0 g. of racemic L- and D-$NH_2$—CL mixture (0.078 mol, optical purity: 50%) were dissolved in 370 ml. of the above solvent mixture at 25° C., and a resulting solution was poured into the first flask (solution of resolving agent), mixed, and stirred keeping the temperature at 25° C.

An hour after precipitation of white crystals started, the formed crystals were filtered off. In this case, the crystallized salt did not settle down to the bottom of the flask but suspended in the solution to maintain the state of fluid slurry, which could be very easily let out through the cock at the bottom of the flask into a centrifugal separator for filtration. The mother liquor was thoroughly squeezed out of the crystals. Upon drying the crystals with hot air, 12.3 g. of a difficultly soluble salt was obtained at a crystallization yield of 37%.

The salt was decomposed using the cation exchange resin by the method of the above Example 28. 4.7 grams of hydrochloride of L-$NH_2$—CL were recovered through elution with hydrochloric acid (yield: 37%, yield from L-form: 74%).

In this example, the total amount of isomeric salt was 33.0 g., total amount of solvent was 1,100 ml., and the solubility ratio defined in the text was 2.7. The optical purity as to the L-form in thus obtained hydrochloride of L-$NH_2$—CL was 99%.

Separately, the filtrate from which the crystals had been removed was concentrated and dried, and a resulting easily soluble salt was decomposed, using the cation exchange resin similarly to the above Example 34. Through elution with aqueous ammonia, 6.1 g. of D,L-$NH_2$—CL mixture containing 79% of D-form were recovered (yield: 61%).

Examples 38–45

In the foregoing Example 37, the solubility ratio was set to be 4.5, total amount of isomeric salt, 33.0 g., and crystallization temperature, at 30° C. respectively. With these conditions unchanged, solvent composition (wt. percent of methanol in methanol-water mixed solvents) and total amount of solvent were varied as in Table 1 below, for each run of optical resolution. The amounts of thus recovered difficultly soluble salts and optical purities of L-$NH_2$—CL's obtained by the decomposition of the said salts were as given also in Table 1.

TABLE 1

| Example Number | Solvent composition (wt. percent of methanol) | Total amount of solvent (ml.) | Amount of difficultly soluble salt (g.) | Optical purity of L-$NH_2$—CL (percent) |
|---|---|---|---|---|
| 38 | 100 | 1,048 | 13.1 | 98 |
| 39 | 94 | 560 | 14.0 | 99 |
| 40 | 90 | 386 | 15.4 | 95 |
| 41 | 80 | 282 | 13.9 | 94 |
| 42 | 60 | 204 | 13.5 | 95 |
| 43 | 40 | 163 | 13.0 | 92 |
| 44 | 20 | 131 | 14.4 | 89 |
| 45 | 1 | 105 | 12.2 | 89 |

Examples 46–47

The optical resolution of the foregoing Example 37 was repeated except that the crystallization temperature was set at 20° C. and the solvent composition was 100% methanol, the solubility ratio and total amount of solvent were varied for each run as in Table 2, and that mixing of the two solutions was effected by pouring the solution of resolving agent into the solution L- and D-$NH_2$—CL mixture. The results are also given in Table 2.

TABLE 2

| Example Number | Solvent composition (methanol wt. percent) | Solubility ratio | Total amount of solvent (ml.) | Amount of difficultly soluble salt (g.) | Optical purity of L-$NH_2$—CL (percent) |
|---|---|---|---|---|---|
| 46 | 100 | 2.5 | 2,481 | 0.9 | 100 |
| 47 | 100 | 6.0 | 1,038 | 13.8 | 93 |

Examples 48 and 49

The optical resolution of the foregoing Example 37 was repeated except that the crystallization temperature was made 50° C., solvent composition was 100% methanol, and the solubility ratio and total amount of solvent were varied as shown in Table 3. The results are also given in Table 3.

TABLE 3

| Example Number | Solvent composition (methanol wt. percent) | Solubility ratio | Total amount of solvent (ml.) | Amount of difficultly soluble salt (g.) | Optical purity of L-$NH_2$—CL (percent) |
|---|---|---|---|---|---|
| 48 | 100 | 2.5 | 1,100 | 2.2 | 96 |
| 49 | 100 | 6.0 | 458 | 14.7 | 88 |

Examples 50–52

The optical resolution of the foregoing Example 37 was repeated except that the crystallization temperature was maintained at 25° C., resolving solvent was a solvent mixture composed of 94 wt. percent of methanol and 6 wt. percent of water, the solubility ratio and total amount of solvent were varied for each run as indicated in Table 4, and that the crystalline racemic D,L-$NH_2$—CL mixture was added directly to the solution of resolving agent dissolved in the total amount of the solvent. The results are given also in Table 4.

TABLE 4

| Example Number | Solvent composition (methanol wt. percent) | Solubility ratio | Total amount of solvent (ml.) | Amount of difficultly soluble salt (g.) | Optical purity of L-$NH_2$—CL (percent) |
|---|---|---|---|---|---|
| 50 | 94 | 2.7 | 1,100 | 12.3 | 100 |
| 51 | 94 | 4.3 | 700 | 14.6 | 100 |
| 52 | 94 | 5.0 | 600 | 15.2 | 90 |

Examples 53–55

The optical resolution of the foregoing Example 37 was repeated with modifications that the crystallization temperature was maintained at 30° C., a solvent mixture of 94 wt. percent of methanol with 6 wt. percent of water was used as the resolving solvent, and that the solubility ratio and total amount of solvent were varied as indicated in Table 5. The results are also given in Table 5.

TABLE 5

| Example Number | Solvent composition (methanol wt. percent) | Solubility ratio | Total amount of solvent (ml.) | Amount of difficultly soluble salt (g.) | Optical purity of L-$NH_2$—CL (percent) |
|---|---|---|---|---|---|
| 53 | 94 | 2.5 | 1,015 | 10.4 | 100 |
| 54 | 94 | 4.6 | 600 | 13.2 | 99 |
| 55 | 94 | 5.1 | 500 | 15.6 | 98 |

Examples 56–59

The optical resolution of the foregoing Example 37 was repeated except that the crystallization temperature was maintained at 30° C., a solvent mixture composed of 94 wt. percent of methanol and 6 wt. percent of water was used as the resolving solvent, and that molar ratio of D,L-$NH_2$—CL to resolving agent, total amount of isomeric salt, the solubility ratio and total amount of solvent were varied respectively for each run as indicated in Table 6 below. The results are also given in Table 6.

TABLE 6

| Example No. | D,L-NH$_2$—CL (g.) | N-p-nitro-benzoyl-L-glutamic acid (g.) | Total amount of isomeric salt (g.) | Solubility ratio | Total amount of solvent (ml.) | Amount of difficultly soluble salt (g.) | Optical purity of L-NH$_2$—CL (percent) |
| --- | --- | --- | --- | --- | --- | --- | --- |
| 56 | 10.0 (0.078 mol.) | 13.9 (0.047 mol.) | 19.9 | 3.6 | 430 | 3.1 | 90 |
| 57 | 10.0 (0.078 mol) | 18.5 (0.062 mol) | 26.4 | 3.8 | 530 | 10.1 | 91 |
| 58 | 10.0 (0.078 mol) | 23.0 (0.078 mol) | 33.0 | 3.7 | 690 | 14.0 | 98 |
| 59 | 10.0 (0.078 mol) | 27.7 (0.094 mol) | 33.0 | 3.7 | 690 | 13.7 | 95 |

Example 60

The optical resolution of the foregoing Example 37 was repeated except that the N-p-nitrobenzoyl-L-glutamic acid was replaced by 23.0 g. of N-p-nitrobenzoyl-D-glutamic acid, total of 600 ml. of a solvent mixture composed of 95 wt. percent of methanol and 5 wt. percent of water was used as the resolving solvent, the crystallization temperature was 30° C., and that solubility ratio was changed to 4.6. As the result, 13.3 g. of a crystalline, difficultly soluble salt was recovered at a crystallization yield of 40%. From the difficultly soluble salt, 5.1 g. of hydrochloride of D-NH$_2$—CL were obtained. The optical purity of the D-form was 97%. The hydrochloride yield from DL-mixture was 40%, and yield from D-form was 80%.

Examples 61–74

The optional resolution of the foregong Example 37 was repeated except that the crystallization temperature was made 25° C., the resolving solvent was changed to a solvent mixture composed of 94 wt. percent of methanol and 6 wt. percent of water, the amount of total isomeric salt was reduced to 3.30 g., and that the solubility ratio and total amount of solvent were varied respectively for each run as indicated in Table 7 below, in order to examine the correlation of solubility ratio with the amount of precipitated difficultly soluble salt, and with the optical purity of L-NH$_2$—CL contained in the salt. The results were as shown in Table 7 below:

TABLE 7

| Example Number | Solubility ratio | Total amount of solvent (ml.) | Difficultly soluble salt (g.) | Optical purity of L-NH$_2$—CL (percent) |
| --- | --- | --- | --- | --- |
| 61 | 2.0 | 150 | 0.00 | |
| 62 | 2.2 | 136 | 0.98 | 99 |
| 63 | 2.7 | 110 | 1.23 | 99 |
| 64 | 3.2 | 94 | 1.35 | 99 |
| 65 | 3.6 | 84 | 1.42 | 99 |
| 66 | 4.0 | 75 | 1.45 | 99 |
| 67 | 4.3 | 70 | 1.46 | 100 |
| 68 | 4.5 | 66 | 1.50 | 94 |
| 69 | 5.0 | 60 | 1.52 | 91 |
| 70 | 5.5 | 55 | 1.54 | 88 |
| 71 | 6.0 | 50 | 1.55 | 85 |
| 72 | 6.5 | 46 | 1.57 | 80 |
| 73 | 7.0 | 43 | 1.62 | 76 |
| 74 | 7.5 | 40 | 1.69 | 69 |

Examples 75 and 76

The optical resolution of the foregoing Example 37 was repeated except that the crystallization temperature was set at 30° C., the resolving solvent was a solvent mixture composed of 90 wt. percent of ethanol and 10 wt. percent of water, and that the solubility ratio and total amount of solvent were varied for each run as indicated in Table 8 below. As the results, difficultly soluble salts of the indicated amount and L-NH$_2$—CL of indicated optical purity were obtained.

TABLE 8

| Example Number | Solvent composition (ethanol wt. percent) | Solubility ratio | Total amount of solvent (ml.) | Amount of difficultly soluble salt (g.) | Optical purity of L-NH$_2$—CL (percent) |
| --- | --- | --- | --- | --- | --- |
| 75 | 90 | 2.5 | 600 | 6.7 | 99 |
| 76 | 90 | 6.0 | 250 | 14.1 | 98 |

Example 77–82

The optical resolution of the foregoing Example 37 was reepated except that the crystallization temperature was made 30° C., a solvent mixture of 60 wt. percent of water and 40 wt. percent of ethanol was used as the resolving solvent, and that the solubility ratio and total amount of solvent were varied for each run as indicated in Table 9 below. As the result, each the indicated amount of difficultly soluble salts and L-NH$_2$—CL of the indicated optical purity were obtained.

TABLE 9

| Example Number | Solvent composition (ethanol wt. percent) | Solubility ratio | Total amount of solvent (ml.) | Amount of difficultly soluble salt (g.) | Optical purity of L-NH$_2$—CL (percent) |
| --- | --- | --- | --- | --- | --- |
| 77 | 40 | 2.0 | 70 | 0.0 | |
| 78 | 40 | 2.5 | 56 | 0.4 | 93 |
| 79 | 40 | 3.3 | 43 | 10.8 | 86 |
| 80 | 40 | 6.0 | 24 | 13.1 | 84 |
| 81 | 40 | 7.0 | 20 | 15.3 | 78 |
| 82 | 40 | 7.5 | 19 | 16.4 | 70 |

[V] EXAMPLES OF OPTICAL RESOLUTION USING N-BENZOYL-L-GLUTAMIC ACID AND N-BENZOYL-D-GLUTAMIC ACID

Example 83

1.3 grams of an equimolar mixture of L- and D-NH$_2$—CL (optical purity: 50%) was dissolved in 10 ml. of warm water of 60° C., and to which 2.5 g. of N-benzoyl-L-glutamic acid were added and dissolved. The solution was allowed to stand for 10 hours, and whereupon a large amount of a crystalline, difficultly soluble salt was precipitated. The salt was filtered, washed with a minor amount of water, and then dried under reduced pressure to yield 2.4 g. of crystals at a crystallization yield of 63%.

The crystalline salt was dissolved in 20 ml. of water, and passed through a resin column of 1.0 cm. in diameter and 18 cm. in height, which was packed with 15 ml. of an acid form cation exchange resin containing sulfonic acid groups (trade name: Diaion SK–1B). The column was then washed with 200 ml. of water. The above liquid passed through the column and the washings were combined, from which N-benzoyl L-glutamic acid was recovered quantitatively.

Subsequently, the resin column was eluted and washed with 200 ml. of 1 N hydrochloric acid. The eluent was concentrated under reduced pressure at 50° C., to produce 1.0 g. of hydrochloride of D,L-NH$_2$—CL mixture containing 70% of L-form (yield: 62%).

Example 84

2.0 grams of N-benzoyl-L-glutamic acid were dissolved in 160 ml. of methanol, and to which 1.0 g. of an equimolar mixture of L- and D-NH$_2$—CL as dissolved in 60 ml. of methanol was added. The solvent was evaporated from the system to dryness under reduced pressure. To the isomeric salt obtained as a residue, 50 ml. of methanol was newly added and stirred at room temperature. The salt was partially insoluble. The system was cooled with an ice bath, to yield 0.54 g. of a difficultly soluble salt (crystallization yield: 18%).

The salt was treated with the resin similarly to above Example 83. Thus 0.22 g. of hydrochloride of D,L-NH$_2$—CL mixture containing 81% of L-form was obtained (yield: 17%).

Example 85

2.5 grams of N-benzoyl-L-glutamic acid were dissolved in 44 ml. of a solvent mixture composed of 94 wt. percent of methanol and 6 wt. percent of water. The solution was placed in a 3-necked flask equipped with a mechanical stirrer and a thermometer. The flask was immersed in a thermostated bath to maintain its content at a temperature of 30° C.

In another vessel, 1.3 g. of an equimolar mixture of L- and D-NH$_2$—CL were dissolved in 25 ml. of the above solvent mixture which was maintained at 30° C., and subsequently poured into the above 3-necked flask. After the precipitation of a crystalline salt started, the content was stirred for an additional hour. The precipitate was separated by filtration, and dried under reduced pressure. Thus 1.5 g. of a crystalline, difficultly soluble salt were recovered, at a crystallization yield of 40%. M.P. 210–213° C., $[\alpha]_D^{22}=-4.0°$ (c.=3.0, water).

0.75 gram of the difficultly soluble salt was decomposed, using the resin in the manner similar to the above Example 83. Thus 0.32 g. of hydrochloride of L-NH$_2$—CL was recovered from the hydrochloric acid eluent (yield: 20%). The optical purity of the L-form was 94%.

Separately, 0.75 g. of the above difficultly soluble salt was recrystallized from 20 ml. of the above solvent mixture, to provide 0.50 g. of needle-like crystals. The yield of the crystallization procedure was 67%.

The crystals were decomposed in the similar manner to the above Example 83, using the same resin, and 0.21 g. of hydrochloride of L-NH$_2$—CL was recovered (yield: 13%).

The specific rotatory power of the L-NH$_2$—CL was $[\alpha]_D^{22}=-24.8°$ (c.=3.2, 1 N hydrochloric acid), and optical purity thereof was 100%.

Example 86

A solution formed by dissolving 12.8 g. (0.10 mol) of an equimolar mixture of L- and D-NH$_2$—CL in 200 ml. of a solvent mixture composed of 94 wt. percent of methanol and 6 wt. percent of water was mixed with another solution dissolving 25.1 g. (0.10 mol) of N-benzoyl-L-glutamic acid in 600 ml. of the above solvent mixture. The system was stirred for 2 hours at 30° C. and then treated in the manner similar to above Example 85. Thus 11.8 g. of a white, difficultly soluble salt were obtained in the yield of 31%.

The salt was decomposed with resin similarly to the foregoing Example 83, and 5.1 g. of hydrochloride of L-NH$_2$—CL were obtained (yield: 31%, yield based on the L-form: 62%). The optical purity of the hydrochloride was 100%.

Example 87

A solution formed by dissolving 2.5 g. of N-benzoyl-L-glutamic acid in 50 ml. of a solvent mixture composed of 90 wt. percent of methanol and 10 wt. percent of water was mixed with another solution dissolving 1.3 g. of an equimolar mixture of L- and D-NH$_2$—CL in 25 ml. of the above solvent mixture, and treated in the manner similar to the above Example 85. Thus 1.2 g. of a crystalline, difficultly soluble salt were obtained (yield of the crystallization: 32%).

The salt was decomposed with resin similarly to the foregoing Example 83, and 0.51 g. of hydrochloride of L-NH$_2$—CL was obtained (yield: 31%). The optical purity thereof was 98%.

Example 88

A solution formed by dissolving 2.0 g. of N-benzoyl-L-glutamic acid in 800 ml. of ethanol was mixed with another solution dissolving 1.0 g. of an equimolar mixture of L- and D-NH$_2$—CL in 200 ml. of ethanol similarly to the above Example 85. To the system, a minor amount of a salt composed of N-benzoyl-L-glutamic acid and D,L-NH$_2$—CL mixture was added as a means of seeding, followed by 7 hours' stirring. Thus 0.75 g. of a crystalline, difficultly soluble salt was recovered (crystallization yield: 25%).

The salt was decomposed in the manner similar to the above Example 83, using the same resin, to produce 0.32 g. of hydrochloride of L-NH$_2$—CL (yield: 25%, optical purity: 92%).

Example 89

A solution formed by dissolving 2.5 g. of N-benzoyl-L-glutamic acid in 60 ml. of a solvent mixture formed of 92 wt. percent of ethanol and 8 wt. percent of water was mixed with another solution formed by dissolving 1.3 g. of an equimolar mixture of L- and D-NH$_2$—CL in 25 ml. of the above solvent mixture, and treated in the manner similar to the above Example 85. Thus 2.6 g. of a crystalline, difficultly soluble salt were obtained, at a crystallization yield of 69%.

The salt was decomposed with resin similarly to the foregoing Example 83, and 1.1 g. of hydrochloride of D,L-NH$_2$—CL mixture containing 59% of L-form were obtained (yield: 68%).

Example 90

A solution formed by dissolving 0.66 g. of N-benzoyl-L-glutamic acid in 70 ml. of a solvent mixture composed of 90 wt. percent of isopropanol and 10 wt. percent of water, and another solution formed by dissolving 0.34 g. of an equimolar mixture of L- and D-NH$_2$—CL in 30 ml. of the above solvent mixture, were treated similarly to the above Example 85, to produce 0.42 g. of a crystalline, difficultly soluble salt. The crystallization yield was 42%.

The salt was decomposed with resin similarly to the foregoing Example 83, to recover 0.18 g. of hydrochloride of D,L-NH$_2$—CL mixture containing 88% of L-form (yield: 42%).

Example 91

A solution obtained by dissolving 1.3 g. of N-benzoyl-L-glutamic acid in 80 ml. of a solvent mixture composed of 90 wt. percent of n-butanol and 10 wt. percent of water, and another solution formed by dissolving 0.68 g. of an equimolar mixture of and D-NH$_2$—CL in 20 ml. of the above solvent mixture were treated similarly to the foregoing Example 85, and 1.15 g. of a crystalline difficultly soluble salt was recovered. The crystallization yield was 57%.

Thus recovered salt was decomposed with resin similarly to the foregoing Example 83, to produce 0.49 g. of hydrochloride of D,L-NH$_2$—CL mixture containing 72% of L-form (yield: 56%).

Example 92

A suspension formed by suspending 1.3 g. of N-benzoyl-

L-glutamic acid in 700 ml. of acetone, and another solution formed by dissolving 0.68 g. of an equimolar mixture of L- and D-NH₂—CL in 300 ml. of acetone were treated similarly to the above Example 85, and 1.8 g. of a crystalline, difficultly soluble salt were obtained. The yield of the crystallization was 89%.

The salt was decomposed with resin similarly to the foregoing Example 83, to produce 0.77 g. of hydrochloride of D,L-NH₂—CL mixture containing 52% of L-form (yield: 88%).

Example 93

A solution formed by dissolving 3.8 g. of N-benzoyl-L-glutamic acid in 22 ml. of ethylene glycol, and another solution formed by dissolving 1.9 g. of an equimolar mixture of L- and D-NH₂—CL in 5 ml. of ethylene glycol, were treated similarly to the foregoing Example 88, and 2.0 g. of a crystalline, difficultly soluble salt were recovered. The crystallization yield were 35%.

The difficultly soluble salt was dissolved in 10 ml. of 1 N-hydrochloric acid and stirred at room temperature. After stirring approximately 30 minutes, N-benzoyl-L-glutamic acid started to precipitate. After stirring for 2 hours, the precipitate was removed by filtration under suction. The filtrate was concentrated and dried to provide hydrochloride of NH₂—CL. Because the hydrochloride still contained a minor amount of N-benzoyl-L-glutamic acid, 10 ml. of isopropanol containing 3 N hydrogen chloride were added thereto, followed by 30 minutes' stirring.

The hydrochloride remaining undissolved was separated by filtration, washed twice with each 2 ml. of isopropanol, and dried under reduced pressure. Thus 0.85 g. of hydrochloride of D,L-NH₂—CL mixture containing 80% of L-form was obtained (yield: 35%).

Example 94

A solution formed by dissolving 2.5 g. of N-benzoyl-D-glutamic acid in 44 ml. of a solvent mixture composed of 94 wt. percent of methanol and 6 wt. percent of water, and another solution formed by dissolving 1.3 g. of an equimolar mixture of L- and D-NH₂—CL in 25 ml. of the same solvent mixture, were treated similarly to the foregoing Example 85, and 1.6 g. of a crystalline, difficultly soluble salt were recovered. The crystallization yield was 41%.

The salt was decomposed with resin similarly to the foregoing Example 83, to produce 0.67 g. of hydrochloride of D,L-NH₂—CL mixture containing 88% of D-form (yield: 41%).

We claim:
1. A process for the optical resolution of mixtures of L- and D-amino-ε-caprolactam, which comprises treating a mixture of L- and D-α-amino-ε-caprolactam with a derivative of L- or D-glutamic acid of the formula

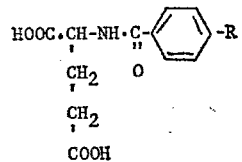

wherein R represents a hydrogen atom or a nitro group (—NO₂)

in a homogeneous liquid medium containing at least 90% by volume of at least one solvent selected from the group consisting of water, aliphatic alcohols of 1–4 carbon atoms, acetone and ethylene glycol, thereby precipitating a difficulty soluble salt consisting of L- or D-α-amino-ε-caprolactam and a derivative of optically active glutamic acid; separating said difficultly soluble salt from the liquid medium containing an easily soluble salt of α-amino-ε-caprolactam and said derivative of optically active glutamic acid; and thereafter decomposing said difficultly soluble salt, easily soluble salt separated from the liquid medium or mixture thereof.

2. The process of claim 1, wherein said liquid medium is selected from the group consisting of water, methanol, ethanol and mixtures thereof.

3. The process of claim 1 wherein 0.8–1.3 mols of said derivative of L- or D-glutamic acid is used per mol of L- and D-α-amino-ε-caprolactam mixture.

4. The process of claim 1 wherein said derivative of glutamic acid is selected from the group consisting of N-p-nitrobenzoyl-L-glutamic acid and N-p-nitrobenzoyl-D-glutamic acid.

5. The process of claim 1 wherein the difficultly soluble or easily soluble salt is treated with a hydrohalic acid in an aqueous medium so as to be decomposed into L-, or D-α-amino-ε-caprolactam and the derivative of L- or D-glutamic acid.

6. The process of claim 1 wherein the difficultly soluble salt or easily soluble salt is dissolved or suspended in an aqueous medium and contacted with the cation exchange resin containing sulfonic acid groups, so as to be decomposed into L- or D-α-amino-ε-caprolactam and the derivative of L- or D-glutamic acid.

7. The process of claim 1 wherein a L- and D-α-amino-ε-caprolactam mixture is treated with N-p-nitrobenzoyl-L-glutamic acid or N-p-nitrobenzoyl-D-glutamic acid in a solvent selected from the group consisting of methanol, methanol-water mixtures, ethanol, and ethanol-water mixtures, to thereby cause precipitation of the difficultly soluble salt of L- or D-α-amino-ε-caprolactam and said derivative of optically active glutamic acid, the reaction being characterized in that the relative amounts of use of said caprolactam mixture and said derivative of glutamic acid to said solvent are so controlled as to satisfy the formula $$2.5C \leq X/Y \leq 7.0C$$

wherein
X is a value of the molar number of the least of the L- and D-α-amino-ε-caprolactam mixture and said glutamic acid derivative, multiplied by 424.4 (gram-mol of the salt formed between them),
Y is a value of the amount (milliliter) of the solvent divided by 100, and
C is a value of the amount (gram) of the salt of L- and D-α-amino-ε-caprolactam mixture and either of N-p-nitrobenzoyl-L-glutamic acid or N-p-nitrobenzoyl-D-glutamic acid that is soluble in 100 ml. of the solvent under saturated concentration at the specific temperature employed for said optical resolution.

8. The process of claim 7 wherein X/Y is so controlled as to satisfy the formula $$2.5C \leq X/Y \leq 6.0C$$

References Cited

UNITED STATES PATENTS

| | | | |
|---|---|---|---|
| 3,542,766 | 11/1970 | Ohnogi et al. | 260—239.3 |
| 2,556,907 | 6/1951 | Emmick | 260—707 |
| 2,625,564 | 1/1953 | Sletzinger et al. | 260—707 |
| 2,906,772 | 9/1959 | Weijlard | 260—707 |
| 2,909,564 | 10/1959 | Hoglan | 260—707 |
| 3,105,067 | 9/1963 | Nelemans et al. | 260—239.3 |
| 3,275,619 | 9/1966 | Brenner et al. | 260—239.3 |

HENRY R. JILES, Primary Examiner

R. T. BOND, Assistant Examiner

U.S. Cl. X.R.

260—707